(12) United States Patent
Wakimoto et al.

(10) Patent No.: US 10,927,775 B2
(45) Date of Patent: Feb. 23, 2021

(54) ENGINE CONTROL DEVICE

(71) Applicant: SUBARU CORPORATION, Tokyo (JP)

(72) Inventors: Kazunari Wakimoto, Tokyo (JP); Ko Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/425,211

(22) Filed: May 29, 2019

(65) Prior Publication Data
US 2020/0095949 A1 Mar. 26, 2020

(30) Foreign Application Priority Data

Sep. 25, 2018 (JP) .............................. JP2018-178369

(51) Int. Cl.
*B60T 7/12* (2006.01)
*F02D 41/00* (2006.01)
(Continued)

(52) U.S. Cl.
CPC ..... *F02D 41/0002* (2013.01); *G06F 16/9017* (2019.01); *G06F 16/90335* (2019.01)

(58) Field of Classification Search
CPC ... B60W 2510/0619; B60W 2710/0622; F02B 19/1052; F02D 19/024; F02D 35/0046;
(Continued)

(56) References Cited

U.S. PATENT DOCUMENTS 5,382,205 A * 1/1995 Togai .................... B60W 10/06
477/43
5,415,139 A * 5/1995 Aoto ...................... B60K 6/485
123/192.1
(Continued)

FOREIGN PATENT DOCUMENTS

JP   H07-019083 A   1/1995
JP   H07-103011 A   4/1995
(Continued)

OTHER PUBLICATIONS

Japanese Office Action, dated Nov. 19, 2019, in Japanese Application No. 2018-178369 and English Translation thereof.

*Primary Examiner* — John Kwon
(74) *Attorney, Agent, or Firm* — McGinn I.P. Law Group, PLLC

(57) ABSTRACT

An engine control device includes an air amount detector, a requested torque acquisitor, a search axis value acquisitor, a storage, and a control target value acquisitor. The air amount detector detects an actual amount of intake air. The requested torque acquisitor acquires a requested torque. In a region of a lean burn region where the actual amount of intake air increases as the requested torque increases, the search axis value acquisitor acquires a value corresponding to the actual amount of intake air. In a region of the of the lean burn region where the actual amount of intake air does not increase as the requested torque increases, the search axis value acquisitor acquires a value corresponding to the requested torque. The control target value acquisitor acquires a control target value of an engine device by searching a device control map using an acquired search axis value.

20 Claims, 4 Drawing Sheets

| | | REQUESTED TORQUE (N×m) | | | | | | | | |
|---|---|---|---|---|---|---|---|---|---|---|
| | | 10 | 30 | 50 | 70 | 90 | 110 | 130 | 150 | 170 |
| ACTUAL AMOUNT OF INTAKE AIR (g/rev) | 10 | 10 | 10 | 10 | 10 | 10 | 10 | 10 | 10 | 10 |
| | 20 | 20 | 20 | 20 | 20 | 20 | 20 | 20 | 20 | 20 |
| | 30 | 30 | 30 | 30 | 30 | SEARCH AXIS VALUE | 30 | 30 | 30 |
| | 40 | 40 | 40 | 40 | 40 | 40 | 40 | 40 | 40 | 40 |
| | 50 | 50 | 50 | 50 | 50 | 50 | 60 | 70 | 80 | 90 |
| | 60 | 60 | 60 | 60 | 60 | 60 | 60 | 70 | 80 | 90 |
| | 70 | 70 | 70 | 70 | 70 | 70 | 70 | 70 | 80 | 90 |
| | 80 | 90 | 90 | 90 | 90 | 90 | 90 | 90 | 90 | 90 |
| | 90 | 100 | 100 | 100 | 100 | 100 | 100 | 100 | 100 | 100 |

────── ▷ AT HIGH PLACE OR HIGH OUTSIDE AIR TEMPERATURE
────────▷ NORMAL STATE
========▷ AT LOW OUTSIDE AIR TEMPERATURE

(51) Int. Cl.
*G06F 16/903* (2019.01)
*G06F 16/901* (2019.01)

(58) Field of Classification Search
CPC .. F02D 33/00; F02D 41/0002; F02D 2700/02; F02D 2700/0225
USPC .......................................... 701/101, 103–105
See application file for complete search history.

(56) References Cited

U.S. PATENT DOCUMENTS

| | | | |
|---|---|---|---|
| 5,727,528 A * | 3/1998 | Hori | ................... F02D 41/0072 123/486 |
| 2016/0363043 A1* | 12/2016 | Hirayama | ............... F02D 41/10 |
| 2017/0009676 A1* | 1/2017 | Sano | ................... F02D 41/0077 |

FOREIGN PATENT DOCUMENTS

| | | |
|---|---|---|
| JP | H11-082090 A | 3/1999 |
| JP | 2002-332884 A | 11/2002 |

* cited by examiner

FIG. 2

| | | REQUESTED TORQUE (N×m) | | | | | | | | |
|---|---|---|---|---|---|---|---|---|---|---|
| | | 10 | 30 | 50 | 70 | 90 | 110 | 130 | 150 | 170 |
| ACTUAL AMOUNT OF INTAKE AIR (g/rev) | 10 | 10 | 10 | 10 | 10 | 10 | 10 | 10 | 10 | 10 |
| | 20 | 20 | 20 | 20 | 20 | 20 | 20 | 20 | 20 | 20 |
| | 30 | 30 | 30 | 30 | 30 | SEARCH AXIS VALUE | 30 | 30 | 30 |
| | 40 | 40 | 40 | 40 | 40 | 40 | 40 | 40 | 40 | 40 |
| | 50 | 50 | 50 | 50 | 50 | 50 | 60 | 70 | 80 | 90 |
| | 60 | 60 | 60 | 60 | 60 | 60 | 60 | 70 | 80 | 90 |
| | 70 | 70 | 70 | 70 | 70 | 70 | 70 | 70 | 80 | 90 |
| | 80 | 90 | 90 | 90 | 90 | 90 | 90 | 90 | 90 | 90 |
| | 90 | 100 | 100 | 100 | 100 | 100 | 100 | 100 | 100 | 100 |

----------→ AT HIGH PLACE OR HIGH OUTSIDE AIR TEMPERATURE

⎯⎯⎯⎯⎯→ NORMAL STATE

========→ AT LOW OUTSIDE AIR TEMPERATURE

ENGINE CONTROL DEVICE

CROSS-REFERENCE TO RELATED APPLICATIONS

The present application claims priority from Japanese Patent Application No. 2018-178369 filed on Sep. 25, 2018, the entire contents of which are hereby incorporated by reference.

BACKGROUND

The disclosure relates to an engine control device, particularly to an engine control device that controls an engine in a lean burn region.

Heretofore, in an engine control, the following method has been widely used. That is, the method obtains a control target value of an engine (for example, a target fuel injection amount, a target ignition timing, a target throttle opening degree, and the like) by detecting a driving state (for example, an engine speed, an amount of intake air, an accelerator opening degree, and the like) by various sensors, and searching a map (lookup table) using the sensor value (input value). The map is set and stored in advance. The map defines a relationship between a sensor value and the control target value.

The stoichiometry control controls the engine in a vicinity of an excess air ratio $\lambda$ of 1.0, that is, in a stoichiometry region. Hereinafter, the term "stoichiometry" may be simply referred to as "stoich". For example, when defining the control target value such as the target fuel injection amount of an injector and the target ignition timing of an ignition plug, the stoich control searches the map (lookup table) which defines each control target value with an actual amount of intake air (parameter of a load axis) and the engine speed as axes, and acquires each control target value.

On the other hand, for example, in order to reduce a pumping loss and reduce a fuel consumption rate, lean burn control is also performed. In the lean burn control, the engine is controlled in a region where the excess air ratio $\lambda$ is larger than 1.0, that is, a region where an air amount is excessive to a fuel amount. In the lean burn control, an operating region in which an amount of intake air is saturated occurs, that is, the operating region in which the amount of intake air does not change in a high load operating region. Therefore, in the lean burn control, it is not appropriate to use an actual amount of intake air as a search axis of the map.

In contrast, Japanese Unexamined Patent Application Publication (JP-A) No. 11-82090 discloses a technology (an internal combustion engine control device) which controls an engine based on a target torque (requested torque) obtained from an operation amount of an accelerator pedal. The control device of JP-A No. 11-82090 detects the operation amount of the accelerator pedal by an accelerator pedal operation amount sensor, calculates a target torque amount to be generated by the engine based on the detected value, determines a control amount of the internal combustion engine such as a required air amount, a required fuel amount, a required ignition timing, and an ISC valve opening degree to achieve the target torque amount, and controls an electronic control throttle, an injector, an ignitor, and an ISC control valve according to the determined control amount. More specifically, for example, when calculating a requested fuel amount Gf from the target torque Trq, the control device of JP-A No. 11-82090 stores data related to the target torque, an engine speed, and a target air-fuel ratio in a ROM in advance in the form of a map, and calculates the requested fuel amount Gf using this map.

SUMMARY

An aspect of the disclosure provides an engine control device including an air amount detector, a requested torque acquisitor, a search axis value acquisitor, a storage, and a control target value acquisitor. The air amount detector is configured to detect an actual amount of intake air to an engine. The requested torque acquisitor is configured to acquire a driver's requested torque in accordance with an operation amount of an accelerator. In a lean burn region where an excess air ratio is larger than 1.0, the search axis value acquisitor is configured to, in a region where the actual amount of intake air increases as the requested torque increases, acquire a value corresponding to the actual amount of intake air as a search axis value to be used in searching a device control map that defines a relationship between the search axis value and a control target value of an engine device in the lean burn region, and, in a region where the actual amount of intake air does not increase as the requested torque increases, acquire a value corresponding to the requested torque as the search axis value. The storage is configured to store the device control map. The control target value acquisitor is configured to acquire the control target value of the engine device by searching the device control map stored in the storage using the search axis value acquired by the search axis value acquisitor.

An aspect of the disclosure provides an engine control device including an air amount detector and circuitry. The air amount detector is configured to detect an actual amount of intake air to an engine. The circuitry is configured to acquire a driver's requested torque in accordance with an operation amount of an accelerator. In a lean burn region where an excess air ratio is larger than 1.0, the circuitry is configured to acquire, in a region where the actual amount of intake air increases as the requested torque increases, a value corresponding to the actual amount of intake air as a search axis value to be used in searching a device control map that defines a relationship between the search axis value and a control target value of an engine device in the lean burn region, and acquire, in a region where the actual amount of intake air does not increase as the requested torque increases, a value corresponding to the requested torque as the search axis value. The circuitry is configured to store the device control map. The circuitry is configured to acquire the control target value of the engine device by searching the stored device control map using the acquired search axis value.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 2 is a diagram illustrating an example of a map (search axis value map) which defines a relationship among an actual amount of intake air, a requested torque, and a search axis value.

DETAILED DESCRIPTION

Figure 1:
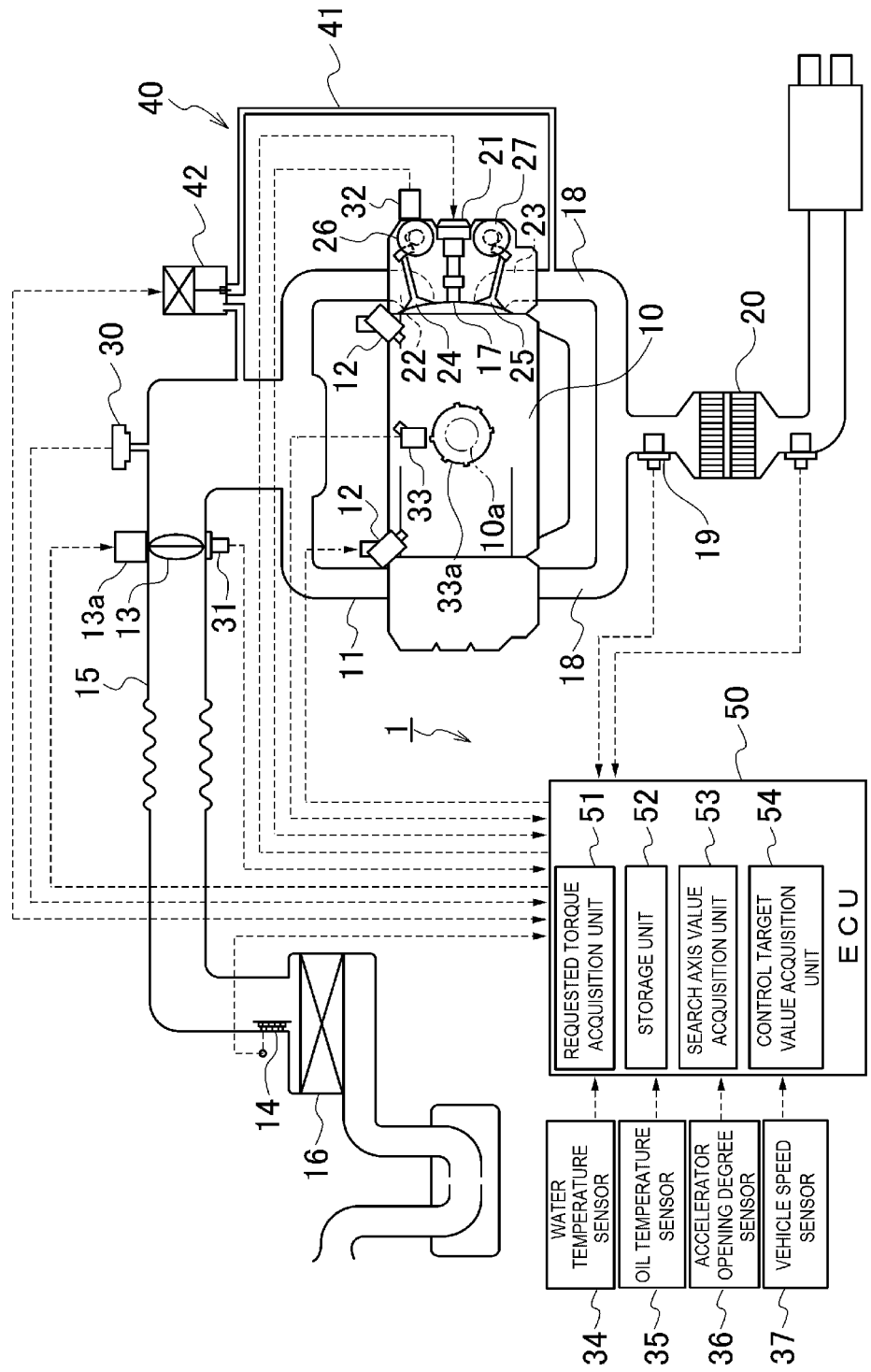
FIG. 1 is a view illustrating the configuration of an engine control device according to an embodiment, and the configuration of an engine to which the engine control device is applied.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

As described above, the control device of JP-A No. 11-82090 can determine the target torque based on the driver's operation amount of the accelerator pedal, and define an amount of intake air, a fuel injection amount, and ignition timing so as to achieve the target torque. However, the density of air changes depending on a temperature and a pressure (atmospheric pressure) of the air (outside air). Thus, the actual amount of air (that is, the mass of air) taken into the engine may vary even if an opening degree of the accelerator pedal is the same, that is, the target torque (requested torque) is the same. That is, the target torque (requested torque) might not correspond to the actual amount of air. Therefore, when the map is searched based on the target torque (requested torque) and the engine is controlled, an accuracy of the engine control might decrease depending on operating conditions.

It is desirable to provide an engine control device that improves an accuracy of the engine control in lean burn.

First, the configuration of an engine control device 1 according to an embodiment will be described with reference to FIG. 1. FIG. 1 is a view illustrating the configuration of the engine control device 1 and the configuration of an engine 10 to which the engine control device 1 is applied.

The engine 10 may be of any type. For example, the engine 10 is a horizontally opposed four-cylinder gasoline engine. The engine 10 is a cylinder injection engine which directly injects fuel into a cylinder. Further, the engine 10 is an engine that operates in a stoich region ($\lambda=1$) and a lean burn region ($\lambda>1$). In the engine 10, the air taken in from an air cleaner 16 is squeezed by an electronically controlled throttle valve (hereinafter, also simply referred to as a "throttle valve") 13 provided in an intake pipe 15, and is taken into each cylinder formed in the engine 10 through an intake manifold 11. Here, the actual amount of intake air to the engine 10 is detected by an airflow meter 14 disposed between the air cleaner 16 and the throttle valve 13. The airflow meter 14 is an example of an air amount detector. In addition, a vacuum sensor 30 is disposed inside a collector unit (surge tank) constituting the intake manifold 11. The vacuum sensor 30 detects a pressure (intake manifold pressure) in the intake manifold 11. Further, the throttle valve 13 is provided with a throttle opening degree sensor 31 that detects the opening degree of the throttle valve 13.

In a cylinder head, an intake port 22 and an exhaust port 23 are formed for each cylinder (FIG. 1 illustrates one bank). The intake port 22 is provided with an intake valve 24 that opens and closes the intake port 22. The exhaust port 23 is provided with an exhaust valve 25 that opens and closes the exhaust port 23. A variable valve timing mechanism 26 is disposed between an intake cam shaft and an intake cam pulley that drive the intake valve 24. The variable valve timing mechanism 26 relatively rotates the intake cam pulley and the intake cam shaft to continuously change a rotational phase (displacement angle) of the intake cam shaft with respect to a crankshaft 10a and advance or retard a valve timing (opening and closing timings) of the intake valve 24. The variable valve timing mechanism 26 is an example of an engine device. The variable valve timing mechanism 26 variably sets the opening and closing timings of the intake valve 24 in accordance with an engine driving state.

Similarly, a variable valve timing mechanism 27 is disposed between an exhaust cam shaft and an exhaust cam pulley. The variable valve timing mechanism 27 relatively rotates the exhaust cam pulley and the exhaust cam shaft to continuously changes the rotational phase (displacement angle) of the exhaust cam shaft with respect to a crankshaft 10a and advance or retard the valve timing (opening and closing timings) of the exhaust valve 25. The variable valve timing mechanism 27 is an example of the engine device. The variable valve timing mechanism 27 variably sets the opening and closing timings of the exhaust valve 25 in accordance with the engine driving state.

An injector 12 is attached to each cylinder of the engine 10. Each injector 12 injects fuel into the corresponding cylinder. The injector 12 is an example of the engine device. The injector 12 directly injects fuel pressurized by a high-pressure fuel pump (not illustrated) into a combustion chamber of each cylinder.

An ignition plug 17 and an ignitor built-in coil 21 are attached to the cylinder head of each cylinder. The ignition plug 17 ignites air-fuel mixture. The ignition plug 17 is an example of the engine device. The ignitor built-in coil 21 applies a high voltage to the ignition plug 17. In each cylinder of the engine 10, the air-fuel mixture of the intake air and the fuel injected by the injector 12 is ignited by the ignition plug 17 and combusted. Exhaust gas after the combustion is discharged through an exhaust pipe 18.

An air-fuel ratio sensor 19 is attached downstream of a merge portion of the exhaust pipe 18 and upstream of an exhaust air purification catalyst 20. Used as the air-fuel ratio sensor 19 is a linear air-fuel ratio sensor (LAF sensor) capable of outputting a signal corresponding to an oxygen concentration and an unburned gas concentration in the exhaust gas (that is, a signal according to the air-fuel ratio of the air-fuel mixture) and capable of linearly detecting the air-fuel ratio.

The exhaust air purification catalyst 20 is disposed downstream of the LAF sensor 19. The exhaust air purification catalyst 20 is a three-way catalyst. The exhaust air purification catalyst 20 oxidizes hydrocarbons (HC) and carbon monoxide (CO) in the exhaust gas and reduces nitrogen oxide (NOx) simultaneously to clean harmful gas components in the exhaust gas into harmless carbon dioxide ($CO_2$), water vapor ($H_2O$), and nitrogen ($N_2$).

An exhaust gas recirculation (EGR) device 40 is provided in the exhaust pipe 18. The EGR device 40 recirculates a part of the exhaust gas discharged from the engine 10 to the intake manifold 11 of the engine 10. The EGR device 40 includes an EGR pipe 41 and an EGR valve 42. The EGR pipe 41 connects the exhaust pipe 18 to the intake manifold 11 of the engine 10. The EGR valve 42 is interposed on the EGR pipe 41 and adjusts an exhaust gas recirculation rate (EGR flow rate). The EGR valve 42 is an example of the engine device. The opening degree (EGRSTP) of the EGR valve 42 is controlled by an electronic control unit 50 (which will be described later) in accordance with the driving state of the engine 10.

Although not illustrated in FIG. 1, the engine 10 may include, for example, a supercharger such as a turbocharger. The turbocharger includes a turbine provided in the exhaust pipe 18 and a compressor which is provided in the intake pipe 15 and which is coupled to the turbine via a rotating shaft. The turbine is driven by the energy of the exhaust gas to compress the air by the coaxial compressor. In this case, an intercooler may be provided. The intercooler cools intake air that has been compressed by the turbocharger (compressor) and has reached a high temperature, by heat exchange.

In addition to the airflow meter 14, the LAF sensor 19, the vacuum sensor 30, and the throttle opening degree sensor 31 described above, a cam angle sensor 32 that identifies cylinders of the engine 10 is provided in the vicinity of a camshaft of the engine 10. A crank angle sensor 33 that detects a rotational position of the crankshaft 10a is provided in the vicinity of the crankshaft 10a of the engine 10. For example, a timing rotor 33a having thirty-four projecting teeth disposed at 10 degrees intervals with two teeth missing is provided at an end of the crankshaft 10a. The crank angle sensor 33 detects a rotational position of the crankshaft 10a by detecting the presence or absence of the protrusion of the timing rotor 33a. For example, the cam angle sensor 32 and the crank angle sensor 33 are of an electromagnetic pickup type.

These sensors are connected to an electronic control unit (hereinafter referred to as "ECU") 50. The ECU 50 is also connected to various sensors such as a water temperature sensor 34 that detects the temperature of coolant of the engine 10, an oil temperature sensor 35 that detects the temperature of lubricating oil, an accelerator pedal opening degree sensor 36 that detects a depression amount of the accelerator pedal, that is, the opening degree of the accelerator pedal, and a vehicle speed sensor 37 that detects the speed of the vehicle. For example, a sensor value (detection value) of the vehicle speed sensor 37 or the like may be read by another control unit, and may be received via a controller area network (CAN) or the like.

The ECU 50 includes a microprocessor that performs calculation, an EEPROM that stores a program that causes the microprocessor to execute each process, a RAM that stores various data such as a calculation result, a backup RAM that keeps data stored therein using a battery, and an input/output interface (I/F). The ECU 50 includes an injector driver that drives the injector 12, an output circuit that outputs an ignition signal, and a motor driver that drives the electric motor 13a that opens and closes the electronically controlled throttle valve 13.

The ECU 50 identifies the cylinder based on the output of the cam angle sensor 32, and obtains the rotation angular velocity and the engine speed based on an output of the crank angle sensor 33. The ECU 50 acquires various kinds of information such as the amount of intake air, an intake pipe negative pressure, the opening degree of the accelerator pedal, the air-fuel ratio of the air-fuel mixture, and the coolant temperature and the oil temperature of the engine 10, based on the detection signals input from the various sensors described above. The ECU 50 comprehensively controls the engine 10 by controlling the fuel injection amount, the ignition timing, and various engine devices such as the throttle valve 13 and the EGR valve 42, based on the various acquired information.

In particular, the ECU 50 has a function of improving the control accuracy of the engine 10 in the lean burn. Therefore, the ECU 50 functionally includes a requested torque acquisition unit 51, a storage unit 52, a search axis value acquisition unit 53, and a control target value acquisition unit 54. In the ECU 50, the functions of the requested torque acquisition unit 51, the storage unit 52, the search axis value acquisition unit 53, and the control target value acquisition unit 54 are implemented by the microprocessor executing the programs stored in the EEPROM and the like.

The requested torque acquisition unit 51 acquires a driver's requested torque in accordance with an operation amount of the accelerator (the opening degree of the accelerator pedal). In one embodiment, the requested torque acquisition unit 51 may serve as a "requested torque acquisitor". More specifically, the requested torque acquisition unit 51 acquires the requested torque by searching, for example, a lookup table (map) stored in advance in the EEPROM or the like based on the opening degree of the accelerator pedal. The lookup table (map) defines a relationship between an operation amount of the accelerator (that is, the opening degree of the accelerator pedal) and a requested torque amount. The requested torque acquisition unit 51 may obtain the requested torque in consideration of, for example, the engine speed, the vehicle speed, and the like in addition to the opening degree of the accelerator pedal. The requested torque acquired by the requested torque acquisition unit 51 is output to the search axis value acquisition unit 53.

The storage unit 52 is configured with the EEPROM or the like. The storage unit 52 stores a search axis value map that defines a relationship among the actual amount of intake air, the requested torque, and the search axis value to be used in searching the device control map in the lean burn region where the excess air ratio λ is larger than 1.0. In one embodiment, the storage unit 52 may serve as a "storage". An example of the map (search axis value map) which defines the relationship among the actual amount of intake air, the requested torque, and the search axis value is illustrated in FIG. 2. In FIG. 2, a horizontal axis (row) indicates the requested torque (Nm), and a vertical axis (column) indicates the actual amount of intake air (g/rev). In the search axis value map, the search axis value (dimensionless number) is given to each combination (grid point) of the requested torque and the actual amount of intake air.

In the search axis value map, in the lean burn region where the excess air ratio λ is larger than 1.0 and in a region where the actual amount of intake air increases as the requested torque increases, values corresponding to the actual amounts of intake air are set as the search axis values to be used in searching the device control map. On the other hand, values corresponding to the requested torques are set as the search axis values in a region where the actual amount of intake air does not increase as the requested torque increases (that is, in a region where the actual amount of intake air is saturated). In the search axis value map, the search axis values are set to be a constant value (a value corresponding to the actual amount of intake air) regardless of a magnitude of the requested torque in a low load region where the actual amount of intake air is not saturated (that is, the actual amount of intake air increases).

Therefore, for example, as indicated by a diagonally right downward arrow in FIG. 2, at first, the opening degree of the throttle valve 13 increases as the requested torque increases (that is, as the opening degree of the accelerator pedal increases), which leads to an increase of the amount of intake air, so that the map value (search axis value) increases as the actual amount of intake air increases. A point comes out where the air is not taken further with respect to the requested torque. Then, the value of the map (search axis value) increases in accordance with the requested torque as indicated by the arrow in a rightward direction. When a vehicle is at a high place or the outside air is at a high temperature, the density of air is lower than that in a normal state. Thus, the amount of intake air does not increase (that is, the amount of intake air is saturated) at a lower requested torque (see a one-dotted chain line arrow) than that in the normal state (see the solid line arrows). On the other hand, when the outside air is at a low temperature, the density of air is higher than that in the normal state. Thus, the amount of intake air does not increase (that is, the amount of intake air is saturated) at a higher requested torque (see broken line arrows) than that in the normal state.

The storage unit 52 stores the device control map that defines the relationship among the search axis value, the engine speed, and the control target value of the engine device in the lean burn region where the excess air ratio $\lambda$ is larger than 1.0. More specifically, the storage unit 52 stores, as the device control map, for example, (i) a map that defines a relationship among the engine speed (NE), the search axis value, and at least one of the target fuel injection amount, the target injection timing, or the injection division ratio (during multi-staged injection) of the injector 12, (ii) a map that defines a relationship among the engine speed, the search axis value, and the target ignition timing of the ignition plug 17, and (iii) a map that defines a relationship among the engine speed, the search axis value, and the target valve opening degree (target recirculation rate) of the EGR valve 42. The storage unit 52 also stores, for example, a map that defines a relationship among the engine speed, the search axis value, and the target opening degree of a tumble generator valve (TGV), and a map that defines a relationship among the engine speed, the search axis value, and the target valve timing. Further, in addition to the various maps for the lean burn control, the storage unit 52 also stores a map for the stoich control having the actual amount of intake air as an axis. Each map stored in the storage unit 52 is used by the search axis value acquisition unit 53 and the control target value acquisition unit 54.

The search axis value acquisition unit 53 acquires a search axis value to be used in searching the device control map in the lean burn region where the excess air ratio $\lambda$ is larger than 1.0. More specifically, the search axis value acquisition unit 53 searches the search axis value map stored in the storage unit 52 using the actual amount of intake air detected by the airflow meter 14 and the requested torque acquired by the requested torque acquisition unit 51, and acquires the search axis value. Data located between grid points is calculated by interpolation processing.

As a result, the search axis value acquisition unit 53 acquires a value corresponding to the actual amount of intake air as the search axis value to be used in searching the device control map in the region where the actual amount of intake air increases as the requested torque increases. On the other hand, in the region where the actual amount of intake air does not increase as the requested torque increases, the search axis value acquisition unit 53 acquires a value corresponding to the requested torque as the search axis value.

In particular, the search axis value acquisition unit 53 acquires a value corresponding to the actual amount of intake air as the search axis value regardless of the magnitude of the requested torque in the low load region where the actual amount of intake air is not saturated (that is, the actual amount of intake air increases). In one embodiment, the search axis value acquisition unit 53 may serve as a "search axis value acquisitor". The search axis value acquired by the search axis value acquisition unit 53 is output to the control target value acquisition unit 54.

The control target value acquisition unit 54 searches the device control map stored in the storage unit 52 using the search axis value acquired by the search axis value acquisition unit 53, and acquires a control target value of the engine device. In one embodiment, the control target value acquisition unit 54 may serve as a "control target value acquisitor".

More specifically, the control target value acquisition unit 54 searches the device control map using the engine speed (NE) and the search axis value, and acquires the control target value of the engine device. As described above, examples of the device control map include (i) the map which defines the relationship among the engine speed (NE), the search axis value, and at least one of the target fuel injection amount, the target injection timing, or the injection division ratio during the multi-staged injection of the injector 12, (ii) the map which defines the relationship among the engine speed, the search axis value, and the target ignition timing of the ignition plug 17, (iii) the map which defines the relationship among the engine speed, the search axis value, and the target valve opening degree of the EGR valve 42, and (iv) a map which defines a relationship among the engine speed, the search axis value, and a target drive amount (valve timing) of the variable valve timing mechanisms 26, 27.

Here, for example, description will be made on a case of acquiring the target fuel injection amount. EEPROM of the ECU 50 or the like stores a map (fuel injection amount map) that defines the relationship among the engine speed (rpm), the search axis value, and the target fuel injection amount. The control target value acquisition unit 54 acquires the target fuel injection amount by searching the fuel injection amount map based on the engine speed and the search axis value. The control target values of other engine devices are also acquired in similar manners. Then, each engine device is controlled (that is, the engine 10 is operated) based on the corresponding control target value.

Figure 3:
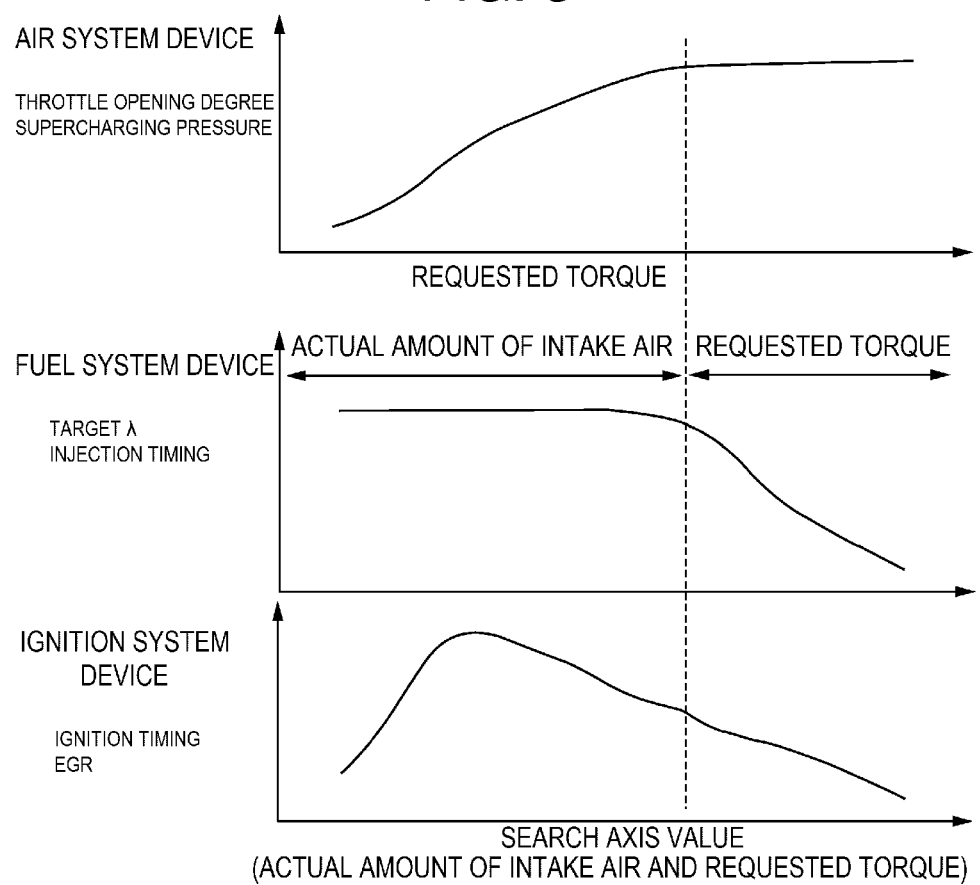
FIG. 3 is a diagram illustrating an example of a trend (change) of each control target value when the requested torque and the actual amount of intake air change in directions of arrows in FIG. 2.

Here, FIG. 3 illustrates an example of a trend (change) of each control target value when the requested torque and the actual amount of intake air change in the directions of the arrows in FIG. 2. Horizontal axes in FIG. 3 indicate the search axis value, that is, the requested torque or the actual amount of intake air. It should be noted that the horizontal axis of the inlet system device is the requested torque. The vertical axes indicate, in order from the top, the target control value of an air system device (a throttle opening degree and a supercharging pressure), the target control value of a fuel system device (a target $\lambda$ (a fuel injection amount) and an injection timing), and the target control value of an ignition system device (an ignition timing and an EGR valve opening degree), respectively. It is assumed that the engine speed is constant. As illustrated in FIG. 3, first, the throttle opening degree and the supercharging pressure (air amount) increase as the requested torque increases, and the valve timing, the target λ, the injection timing, the ignition timing, and the EGR are controlled using the axis value corresponding to the actual amount of intake air in the region where the amount of intake air increases as the throttle opening degree and the supercharging pressure (air amount) increase. Then, when the amount of intake air does not increase (the amount of intake amount is saturated), the valve timing, the target λ, the injection timing, the ignition timing, and the EGR are controlled using the axis value corresponding to the requested torque.

Figure 4:
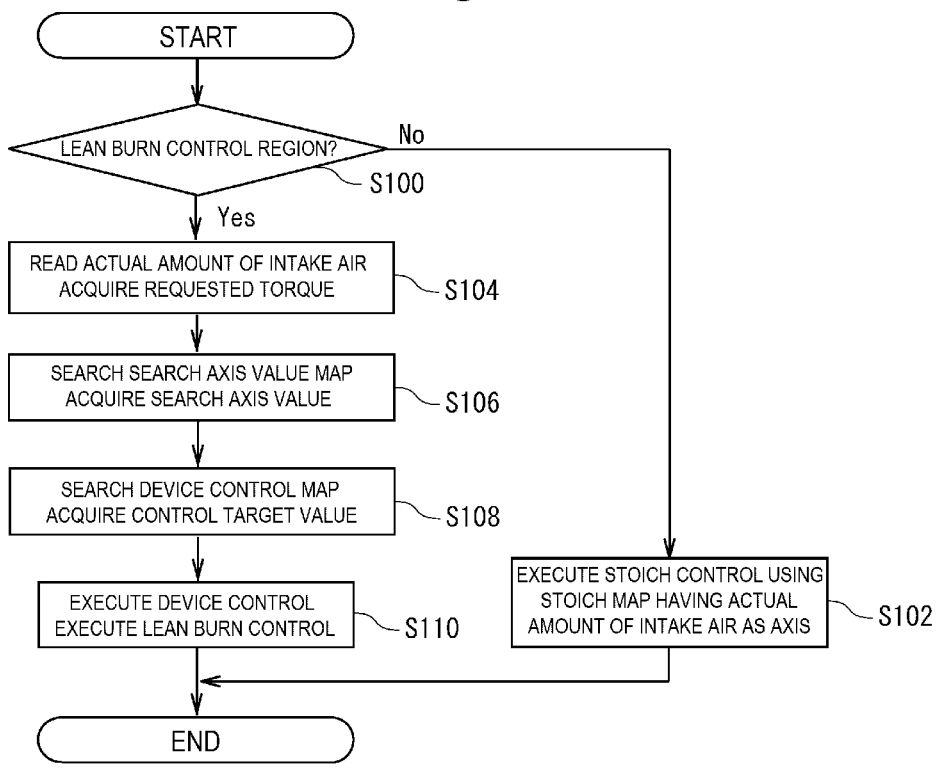
FIG. 4 is a flowchart illustrating a processing procedure of a map search process by the engine control device according to the embodiment.

Next, an operation of the engine control device 1 will be described with reference to FIG. 4. FIG. 4 is a flowchart illustrating a processing procedure of a map search process by the engine control device 1. The process is repeatedly executed by the ECU 50 at a predetermined timing.

First, in step S100, a determination is made as to whether a region is the lean burn control region. Here, when the region is not the lean burn control region, the stoich control using the stoich control map having the actual amount of intake air as the axis is executed in step S102. Then, the process ends. On the other hand, when the region is the lean burn control region, the process proceeds to step S104.

In step S104, the actual amount of intake air detected by the airflow meter 14 is read, and the requested torque is acquired based on the throttle opening degree in the requested torque acquisition unit 51. Subsequently, in step S106, the search axis value map (lookup table) stored in the storage unit 52 is searched using the actual amount of intake air and the requested torque, which are acquired in step S104, and the search axis value is acquired. Here, since the search axis value map and the method for searching the search axis value map are as described above, a detailed description thereof will be omitted.

Next, in step S108, the plural device control maps stored in the storage unit 52 are searched using the search axis value acquired in step S106 and the engine speed, and the control target value of each engine device is acquired. That is, for example, acquired are at least one of the target fuel injection amount, the target injection timing, or an injection division ratio of the injector 12, the target ignition timing of the ignition plug 17, the target valve opening degree (target recirculation rate) of the EGR valve 42, and the target drive amount (target valve timing) of the variable valve timing mechanism 26, 27.

Then, in step S110, the engine 10 is controlled (operated) based on each control target value acquired in step S108.

As described in detail above, according to the embodiment, in the lean burn region where the excess air ratio λ is larger than 1.0 and in the region where the actual amount of intake air increases as the requested torque increases, the value corresponding to the actual amount of intake air is acquired as the search axis value to be used in searching the device control map. In the region where the actual amount of intake air does not increase as the requested torque increases, the value corresponding to the requested torque is acquired as the search axis value. Then, the device control map is searched using the acquired search axis value, and the control target value of the engine device is acquired. That is, in the region where the actual amount of intake air changes (increases), the map search is performed using the actual amount of intake air which higher in accuracy than the requested torque, and the engine device is controlled. Thus, the control accuracy can be improved. In addition, the control region using the actual amount of intake air can be extended to the boundary (limit) at which the actual air amount is saturated. Thus, the control accuracy can be improved. As a result, it is possible to improve the control accuracy of the engine 10 in lean burn. In this case, it is not necessary to switch (change) between maps having different axes, that is, between the map having the actual amount of intake air as an axis and the map having the requested torque as an axis. Thus, it is possible to prevent a torque step that may occur at the time of switching between the maps.

Generally, a time delay occurs from when the accelerator pedal is depressed to when the air amount actually taken into the engine 10 increases. In contrast, according to the embodiment, in the low load region where the actual amount of intake air is not saturated, the value corresponding to the actual amount of intake air is acquired as the search axis value regardless of the magnitude of the requested torque. Therefore, the delay of the amount of intake air can be considered, and the control accuracy can be further improved.

According to the embodiment, the search axis value map which defines the relationship among the actual amount of intake air, the requested torque, and the search axis value is stored, and the search axis value map is searched using the actual amount of intake air and the requested torque to acquire the search axis value. Therefore, even if each relationship is not linear (even if any of the relationships is non-linear), the above-described search axis value can be appropriately acquired based on the actual amount of intake air and the requested torque, using the map.

According to the embodiment, the engine devices include, for example, the injector 12 which injects fuel, the ignition plug 17 which ignites the air-fuel mixture, and the EGR valve 42 which adjusts the recirculation rate of the exhaust gas to an inlet system. The injector 12 (fuel amount), the ignition plug 17 (ignition timing), the EGR valve 42 (exhaust gas recirculation rate), and the like are controlled using a more appropriate axis component (axis value) to ensure the combustion robustness.

According to the embodiment, by using the engine speed and the search axis value, the device control map, for example, (i) the map which defines the relationship among the engine speed, the search axis value, and at least one of the target fuel injection amount or the target injection timing of the injector 12, (ii) the map which defines the relationship among the engine speed, the search axis value, and the target ignition timing of the ignition plug 17, (iii) the map which defines the relationship among the engine speed, the search axis value, and the target valve opening degree of the EGR valve 42, and the like are searched. Thus, it is possible to perform the map search using the more appropriate axis component (search axis value) among the actual amount of intake air and the requested torque, and to acquire the target control value.

The embodiment of the disclosure has been described above. It should be noted that the disclosure is not limited to the above embodiment. Various modifications may be made. For example, in the above embodiment, the disclosure is applied to the control device of the direct injection engine that performs operation in the lean burn region. Alternatively, the disclosure is applicable to, for example, a control device of a lean burn engine for a port injection. Further, the disclosure may also deal with a region other than the lean burn region (for example, when stoich high load, etc) in which the requested torque and the actual amount of intake air do not have a proportional relationship with respect to the required air amount.

In the embodiment described above, examples of the engine device include the injector 12 which injects fuel, the ignition plug 17 which ignites an air-fuel mixture, the EGR valve 42 which adjusts the recirculation rate of the exhaust gas to the inlet system, and the variable valve timing mechanisms 26, 27 which change the valve timing. It should be noted that the engine device is not limited to the above-described examples. Instances of the engine device may include the tumble generate valve (TGV) that adjusts the strength of the tumble in the cylinder.

According to the embodiment of the disclosure, it is possible to improve an accuracy of an engine control in lean burn.

The invention claimed is:

1. An engine control device comprising:
   an air amount detector configured to detect an actual amount of intake air to an engine;
   a requested torque acquisitor configured to acquire a driver's requested torque in accordance with an operation amount of an accelerator;
   a search axis value acquisitor configured to, in a lean burn region where an excess air ratio is larger than 1.0:
      acquire, in a region where the actual amount of intake air increases as the requested torque increases, a value corresponding to the actual amount of intake air as a search axis value to be used in searching a device control map that defines a relationship between the search axis value and a control target value of an engine device in the lean burn region; and
      acquire, in a region where the actual amount of intake air does not increase as the requested torque increases, a value corresponding to the requested torque as the search axis value;
   a storage configured to store the device control map; and
   a control target value acquisitor configured to acquire the control target value of the engine device by searching the device control map stored in the storage using the search axis value acquired by the search axis value acquisitor.

2. The engine control device according to claim 1, wherein, in a low load region where the actual amount of intake air is not saturated, the search axis value acquisitor acquires the value corresponding to the actual amount of intake air as the search axis value regardless of a magnitude of the requested torque.

3. The engine control device according to claim 1, wherein the storage is configured to store a search axis value map which defines a relationship among the actual amount of intake air, the requested torque, and the search axis value in the lean burn region, and
   wherein the search axis value acquisitor is configured to acquire the search axis value by searching the search axis value map stored in the storage using the actual amount of intake air detected by the air amount detector and the requested torque acquired by the requested torque acquisitor.

4. The engine control device according to claim 2, wherein the storage is configured to store a search axis value map which defines a relationship among the actual amount of intake air, the requested torque, and the search axis value in the lean burn region, and
   wherein the search axis value acquisitor is configured to acquire the search axis value by searching the search axis value map stored in the storage using the actual amount of intake air detected by the air amount detector and the requested torque acquired by the requested torque acquisitor.

5. The engine control device according to claim 1, wherein the engine device comprises at least one of an injector configured to inject fuel, an ignition plug configured to ignite an air-fuel mixture, or an exhaust gas recirculation valve configured to adjust a recirculation rate of an exhaust gas to an inlet system.

6. The engine control device according to claim 2, wherein the engine device comprises at least one of an injector configured to inject fuel, an ignition plug configured to ignite an air-fuel mixture, or an exhaust gas recirculation valve configured to adjust a recirculation rate of an exhaust gas to an inlet system.

7. The engine control device according to claim 3, wherein the engine device comprises at least one of an injector configured to inject fuel, an ignition plug configured to ignite an air-filet mixture; or an exhaust gas recirculation valve configured to adjust a recirculation rate of an exhaust gas to an inlet system.

8. The engine control device according to claim 4, wherein the engine device comprises at least one of an injector configured to inject fuel, an ignition plug configured to ignite an air-fuel mixture, or an exhaust gas recirculation valve configured to adjust a recirculation rate of an exhaust gas to an inlet system.

9. The engine control device according to claim 5, wherein the device control map comprises at least one of:
   a map that defines a relationship among an engine speed, the search axis value, and at least one of a target fuel injection amount or a target injection timing of the injector;
   a map that defines a relationship among the engine speed, the search axis value, and a target ignition timing of the ignition plug; or
   a map that defines a relationship among the engine speed, the search axis value, and a target valve opening degree of the exhaust gas recirculation valve, and
   wherein the control target value acquisitor is configured to search the map using the engine speed and the search axis value.

10. The engine control device according to claim 6, wherein the device control map comprises at least one of:
    a map that defines a relationship among an engine speed, the search axis value, and at least f a target fuel injection amount or a target injection timing of the injector;
    a map that defines a relationship among the engine speed, the search axis value, and a target ignition timing of the ignition plug; or
    a map that defines a relationship among the engine speed, the search axis value, and a target valve opening degree of the exhaust gas recirculation valve, and
    wherein the control target value acquisitor is configured to search the map using the engine speed and the search axis value.

11. The engine control device according to claim 7, wherein the device control map comprises at least one of:
    a map that defines a relationship among an engine speed, the search axis value, and at least one of a target fuel injection amount or a target injection timing of the injector;
    a map that defines a relationship among the engine speed, the search axis value, and a target ignition timing of the ignition plug; or
    a map that defines a relationship among the engine speed, the search axis value, and a target valve opening degree of the exhaust gas recirculation valve, and
    wherein the control target value acquisitor is configured to search the map using the engine speed and the search axis value.

12. The engine control device according to claim 8, wherein the device control map comprises at least one of:
a map that defines a relationship among an engine speed, the search axis value, and at least one of a target fuel injection amount or a target injection timing of the injector;
a map that defines a relationship among the engine speed, the search axis value, and a target ignition timing of the ignition plug; or
a map that defines a relationship among the engine speed, the search axis value, and a target valve opening degree of the exhaust gas recirculation valve, and
wherein the control target value acquisitor is configured to search the map using the engine speed and the search axis value.

13. An engine control device, comprising:
an air amount detector configured to detect an actual amount of intake air to an engine; and
a circuitry configured:
acquire a driver's requested torque in accordance with an operation amount of an accelerator;
in a lean burn region where an excess air ratio is larger than 1.0, acquire, in a region where the actual amount of intake air increases as the requested torque increases, a value corresponding to the actual amount of intake air as a search axis value to be used in searching a device control map that defines a relationship between the search axis value and a control target value of an engine device in the lean burn region, and acquire, in a region where the actual amount of intake air does not increase as the requested torque increases, a value corresponding to the requested torque as the search axis value;
store the device control map; and
acquire the control target value of the engine device by searching the stored device control map using the acquired search axis value.

14. The engine control device according to claim 1, wherein the engine control device is programmed such that the search axis value acquisitor acquires, in the region where the actual amount of intake air increases as the requested torque increases, the value corresponding to the actual amount of intake air as the search axis value.

15. The engine control device according to claim 14, wherein the engine control device is further programmed such that the search axis value acquisitor acquires, in the region where the actual amount of intake air does not increase as the requested torque increases, the value corresponding to the requested torque as the search axis value.

16. The engine control device according to claim 1, wherein the engine device comprises an ignition plug configured to ignite an air-fuel mixture.

17. The engine control device according to claim 16, wherein the device control map comprises a map that defines a relationship among an engine speed, a search axis value, and a target ignition timing of the ignition plug, and
wherein the control target value acquisitor is configured to search the map using the engine speed and the search axis value.

18. The engine control device according to claim 1, wherein the engine device comprises an exhaust gas recirculation valve configured to adjust a recirculation rate of an exhaust gas to an inlet system.

19. The engine control device according to claim 18, wherein the device control map comprises a map that defines a relationship among an engine speed, a search axis value, and a target valve opening degree of the exhaust gas recirculation valve, and
wherein the control target value acquisitor is configured to search the map using the engine speed and the search axis value.

20. The engine control device according to claim 13, wherein the engine control device is programmed such that the circuitry acquires:
in the region where the actual amount of intake air increases as the requested torque increases, the value corresponding to the actual amount of intake air as the search axis value; and
in the region where the actual amount of intake air does not increase as the requested torque increases, the value corresponding to the requested torque as the search axis value.

* * * * *